US012664400B2

(12) United States Patent
Sharma et al.

(10) Patent No.: US 12,664,400 B2
(45) Date of Patent: Jun. 23, 2026

(54) FORMULATION GRAPH CONVOLUTION NETWORKS (F-GCN) FOR PREDICTING PERFORMANCE OF FORMULATED PRODUCTS

(71) Applicant: International Business Machines Corporation, Armonk, NY (US)

(72) Inventors: Vidushi Sharma, San Jose, CA (US); Maxwell Giammona, Fremont, CA (US); Dmitry Zubarev, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 854 days.

(21) Appl. No.: 17/977,832

(22) Filed: Oct. 31, 2022

(65) Prior Publication Data

US 2024/0143969 A1 May 2, 2024

(51) Int. Cl.
*G06N 3/04* (2023.01)
*G06N 3/08* (2023.01)

(52) U.S. Cl.
CPC ................ *G06N 3/04* (2013.01); *G06N 3/08* (2013.01)

(58) Field of Classification Search
CPC ................................... G06N 3/04; G06N 3/08
USPC ........................................................ 706/25
See application file for complete search history.

(56) References Cited

U.S. PATENT DOCUMENTS

| | | | | |
|---|---|---|---|---|
| 6,587,845 B1 * | 7/2003 | Braunheim | ............ | G16C 20/70 |
| | | | | 706/20 |
| 2010/0234246 A1 * | 9/2010 | Jung | ...................... | G16B 40/00 |
| | | | | 706/54 |

| | | | | |
|---|---|---|---|---|
| 2017/0288270 A1 * | 10/2017 | Li | ..................... | H01M 10/0525 |
| 2018/0137155 A1 * | 5/2018 | Majumdar | .......... | G06F 16/2228 |
| 2019/0108320 A1 * | 4/2019 | Fan | ........................ | G16C 20/80 |
| 2019/0220573 A1 * | 7/2019 | Kwon | ................... | G06N 3/126 |

(Continued)

FOREIGN PATENT DOCUMENTS

| | | |
|---|---|---|
| CN | 106773689 A | 5/2017 |
| CN | 109658162 A | 4/2019 |

(Continued)

OTHER PUBLICATIONS

Unknown, "AI for formulation", Chemintelligence, 2020, 4 Pages, https://chemintelligence.com/ai-for-formulation.

(Continued)

*Primary Examiner* — Ann J Lo

(74) *Attorney, Agent, or Firm* — James L. Olsen

(57) ABSTRACT

A formulation graph convolution network (F-GCN) with multiple GCNs assembled in parallel and connected to filters and an external learning architecture is able to predict the effectiveness of a formulation. Input into the multiple GCNs are molecular structures of formulants, which are processed as molecular graphs and output as molecular descriptors. The molecular descriptors are filtered by normalized ratios or fractions of the ingredient molecules in a formulation, such as a battery electrolyte or solvent. A formulation descriptor combines the filtered molecular descriptors to arrive at a predicted performance for the formulation, such as the battery capacity for an electrolyte formulation, by an external learning architecture. F-GCN may use a pre-trained GCN with physico-chemical properties of known molecular structures.

25 Claims, 11 Drawing Sheets

(56) References Cited

U.S. PATENT DOCUMENTS

| | | | | |
|---|---|---|---|---|
| 2021/0043283 A1* | 2/2021 | Rong | | G16C 20/80 |
| 2021/0049467 A1 | 2/2021 | Riedmiller et al. | | |
| 2021/0081505 A1* | 3/2021 | Bai | | G06N 3/04 |
| 2021/0406592 A1* | 12/2021 | Li | | G06F 16/532 |
| 2022/0198286 A1* | 6/2022 | Prat | | G06V 10/82 |
| 2023/0359929 A1* | 11/2023 | Shmilovich | | G16C 20/30 |
| 2024/0136025 A1* | 4/2024 | Xie | | G16C 20/10 |

FOREIGN PATENT DOCUMENTS

| | | | | |
|---|---|---|---|---|
| CN | 109901403 A | 6/2019 | | |
| CN | 111291270 A | 6/2020 | | |
| CN | 111665861 A | 9/2020 | | |
| CN | 114580252 A | 6/2022 | | |
| IN | 114494254 A | 5/2022 | | |
| WO | WO-02082329 A2 * | 10/2002 | | G16C 20/30 |
| WO | 2022061170 A1 | 3/2022 | | |
| WO | 2022069740 A1 | 4/2022 | | |

OTHER PUBLICATIONS

Unknown, "Formulation design", intellegens, 2024, 6 Pages, https://intellegens.com/applications/formulations/.

Benayad et al., High-Throughput Experimentation and Computational Freeway Lanes for Accelerated Battery Electrolyte and Interface Development Research, Advanced Energy Materials 12(2102678):1-30 (2022).

Chen et al., Graph Networks as a Universal Machine Learning Framework for Molecules and Crystals, Chemistry of Materials 31:3564-3572 (2019).

Duvenaud et al., Convolutional Networks on Graphs for Learning Molecular Fingerprints, publication of Harvard University, pp. 1-9 (2015).

Gong et al., Graph-based deep learning frameworks for molecules and solid-state materials, Computational Materials Science 195(110332):1-9 (2021).

Gritsenko et al., Graph Transfer Learning, publication of the Department of Electrical and Computer Engineering, Northwestern University, pp. 1-10 (2021).

Harada et al., Dual graph convolutional neural network for predicting chemical networks, BMC Bioinformatics 21(Suppl 3):94 (pp. 1-13) (2020).

Hastie et al., The Elements of Statistical Mining, Data Mining, Inference, and Prediction, Springer, 2nd ed., Aug. 2008.

Huang et al., Graph convolution for predicting associations between miRNA and drug resistance, Bioinformatics 36(3):851-858 (2002).

Jiang et al., Could graph neural networks learn better molecular representation for drug discovery? A comparison study of descriptor-based and graph-based models, Journal of Cheminformatics 13:12 (pp. 1-23) (2021).

Kearnes et al., Molecular graph convolutions: moving beyond fingerprints, Journal of Computer Aided Molecular Design 30(8):595-608 (2016).

Khemchandani et al., DeepGraphMolGen, a multi-objective, computational strategy for generating molecules with desirable properties: a graph convolution and reinforcement learning approach, Journal of Cheminformatics 12:53 (pp. 1-17) (2020).

Kipf et al., Semi-supervised Classification with Graph Convolution Networks, publication presented at the 2017 International Conference on Learning Representations (ICLR), pp. 1-14 (2017).

Koppel et al., Consistent Online Gaussian Process Regression Without the Sample Complexity Bottleneck, Statistics and Computing 31(76):1-18 (2021).

Li et al., DeepChemStable: Chemical Stability Prediction with an Attention-Based Graph Convolution Network, Journal of Chemical Information and Modeling 59:1044-1049 (2019).

Shang et al., Multi-view spectral graph convolution with consistent edge attention for molecular modeling, Neurocomputing 445:12-25 (2021).

Sharma et al., Transfer Learning Enabled Deep Learning Model for the Prediction of Battery Performance from Electrolyte Formulations, presentation at Fall 2022 meeting of the Electrochemical Society (ECS) (Oct. 13, 2022).

Shtereve et al., Bayesian Multi-Plate High-Throughput Screening of Compounds, Nature Scientific Reports 8:9951 (pp. 1-10) (2018).

Sun et al., Graph convolutional networks for computational drug development and discovery, Briefings in Bioinformatics 21(3):919-935 (2020).

Tsubaki et al., On the equivalence of molecular graph convolution and molecular wave function with poor basis set, publication presented at the 34th Conference of Neural Information Processing Systems (NeurIPS 2020), pp. 1-12 (2020).

Wu et al., A Comprehensive Survey on Graph Neural Networks, Journal of Latex Class Files, pp. 1-22 (2019).

Zhang et al., Graph convolutional networks: a comprehensive review Computational Social Networks 6:11 (pp. 1-23) (2019).

Zhou et al., Graph neural networks: A review of methods and applications, AI Open 1:57-81 (2020).

Goswami et al., "Transfer learning enhanced physics informed neural network for phase-field modeling of fracture", arXiv:1907.02531v1 [stat.ML], Jul. 4, 2019, 21 pages.

* cited by examiner

100

101

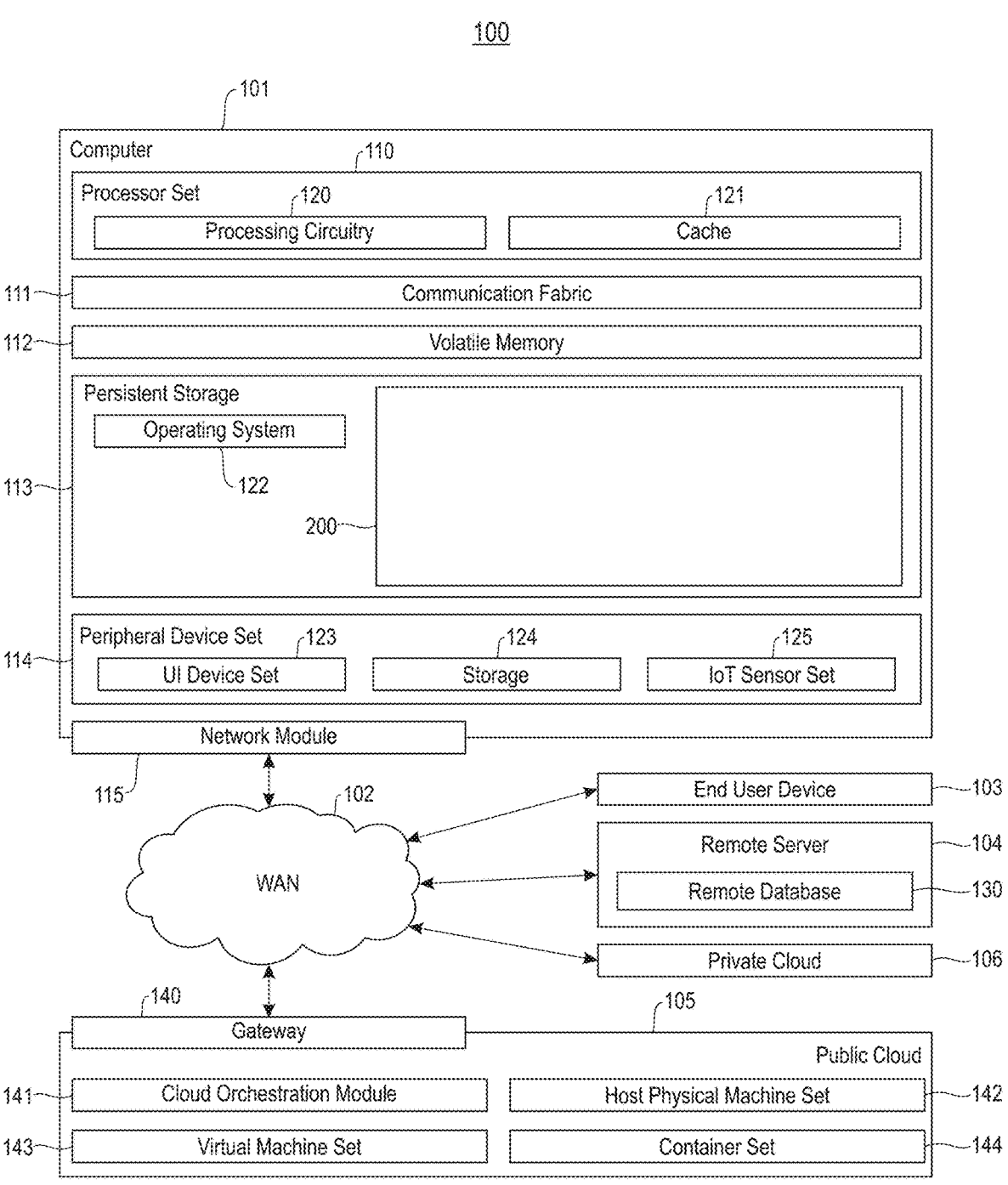

Computer

110

Processor Set

120
Processing Circuitry

121
Cache

111
Communication Fabric

112
Volatile Memory

113
Persistent Storage

Operating System

122

200

114
Peripheral Device Set

123
UI Device Set

124
Storage

125
IoT Sensor Set

115
Network Module

102
WAN

103
End User Device

104
Remote Server

130
Remote Database

106
Private Cloud

140
Gateway

105
Public Cloud

141
Cloud Orchestration Module

142
Host Physical Machine Set

143
Virtual Machine Set

144
Container Set

FIG. 8

FORMULATION GRAPH CONVOLUTION NETWORKS (F-GCN) FOR PREDICTING PERFORMANCE OF FORMULATED PRODUCTS

STATEMENT REGARDING PRIOR DISCLOSURES BY THE INVENTORS

The following disclosure is submitted under 35 U.S.C. 102(b)(1)(A): Sharma et al., "Transfer Learning Enabled Deep Learning Model for the Prediction of Battery Performance from Electrolyte Formulations," presented to the Electrochemical Society Fall Meeting on Oct. 13, 2022.

TECHNICAL FIELD

The present invention relates generally artificial intelligence (AI) and more specifically to application of a graph convolution network for predicting performance of a formulation for an application.

BACKGROUND OF THE INVENTION

The performance of a formulated product, such as a battery electrolyte, involves complex interactions between different constituents. For example, the role of electrolytes in battery capacity retention and cycle life is dependent upon the composition and/or molar percentage of the solvents and additive salts used in the battery. To predict performance metrics for formulated products, such as battery electrolytes, the exact mixture of constituents with certain domain intuitive physico-chemical properties must be determined. Determining the constituent mixture for high performance may be carried out through supervised learning approaches, such as Bayesian optimization, regression models, or ensemble models. Because supervised machine learning approaches require intelligent input feature selection processes, which are computationally demanding to determine from simulations, it is difficult for these machine learning approaches to capture the complex chemical space of electrolyte formulations from a limited set of features.

There remains a need in the art for a way to map molecular structures and their composition in a formulation directly to the formulation's performance.

SUMMARY OF THE INVENTION

The claimed invention overcomes the need in the art by providing a formulation graph convolution network (F-GCN) that is able to predict the performance of a formulation for an application. For example, where the application is a battery, the F-GCN can predict the performance of an electrolyte and/or solvent formulation.

In one embodiment, the present invention relates to a system comprising: multiple graph convolution networks (GCNs) assembled in parallel, wherein input into each GCN is a molecular structure and output is a molecular descriptor of the input molecular structure; a composition filter that scales each molecular descriptor according to a normalized ratio of the molecular structure in a formulation; a filtered descriptor that combines each scaled molecular descriptor to form a single formulation descriptor representing each molecular structure in the formulation; and an external learning architecture that connects the single formulation descriptor to a performance label for the formulation.

In another embodiment, the present invention relates to a system for predicting the effectiveness of an electrolyte and/or solvent formulation comprising: multiple graph convolution networks (GCNs) assembled in parallel, wherein input into each GCNs is a molecular structure for a compound in an electrolyte and/or solvent formulation and output is a molecular descriptor of the input molecular structure; a composition filter that scales the molecular descriptor according to weight or molar percentage of the molecular structure in the electrolyte and/or solvent formulation; a filtered descriptor that combines each molecular descriptor to form a single formulation descriptor representing the molecular structures in the electrolyte and/or solvent formulation; and a learning architecture comprising a dense neural network that connects the single formulation descriptor to a battery capacitance performance label for the electrolyte and/or solvent formulation.

In a further embodiment, the present invention relates to a computer-implemented method comprising: entering multiple molecular structures into respective multiple graph convolution networks arranged in parallel; generating molecular descriptors for each molecular structure; scaling the molecular descriptors based on a normalized ratio of the molecular structure in a formulation to generate filtered descriptors of the molecular structures in the formulation; combining the filtered descriptors to form a single formulation descriptor representing each molecular structure in the formulation; and feeding the formulation descriptor into an external learning architecture to generate a prediction of the formulation for a specific application.

In another embodiment, the present invention relates to a computer-implemented method for predicting the effectiveness of an electrolyte and/or solvent formulation comprising: entering multiple molecular structures for a battery electrolyte and/or solvent into respective multiple graph convolution networks arranged in parallel; generating molecular descriptors for each molecular structure; scaling the molecular descriptors based on molar and/or weight percentage of the molecular structure in an electrolyte and/or solvent formulation to generate filtered descriptors of the molecular structures; combining the filtered descriptors to form a single formulation descriptor representing the molecular structures in the formulation; and feeding the formulation descriptor into an external learning architecture to generate a battery capacitance prediction for the electrolyte and/or solvent formulation.

In a further embodiment, the present invention relates to a computer program product for predicting the effectiveness of a formulation for an application comprising: program instructions on one or more computer readable storage media for entering multiple molecular structures into respective multiple graph convolution networks arranged in parallel; program instructions on one or more computer readable storage media for generating molecular descriptors from the molecular structures; program instructions on one or more computer readable storage media for scaling the molecular descriptors based on normalized ratios of the molecular structures in a formulation to form filtered descriptors; program instructions on one or more computer readable storage media for combining the filtered descriptors into a single formulation descriptor representing the molecular structures in the formulation; and program instructions on one or more computer readable storage media for feeding the single formulation descriptor into an external learning architecture to generate a prediction of the formulation for an application.

Additional aspects and/or embodiments of the invention will be provided, without limitation, in the detailed description of the invention that is set forth below.

BRIEF DESCRIPTION OF THE DRAWINGS

FIG. 8 is a schematic diagram of a computer environment that may be used to implement the F-GCN described herein.

DETAILED DESCRIPTION OF THE INVENTION

Figure 1:
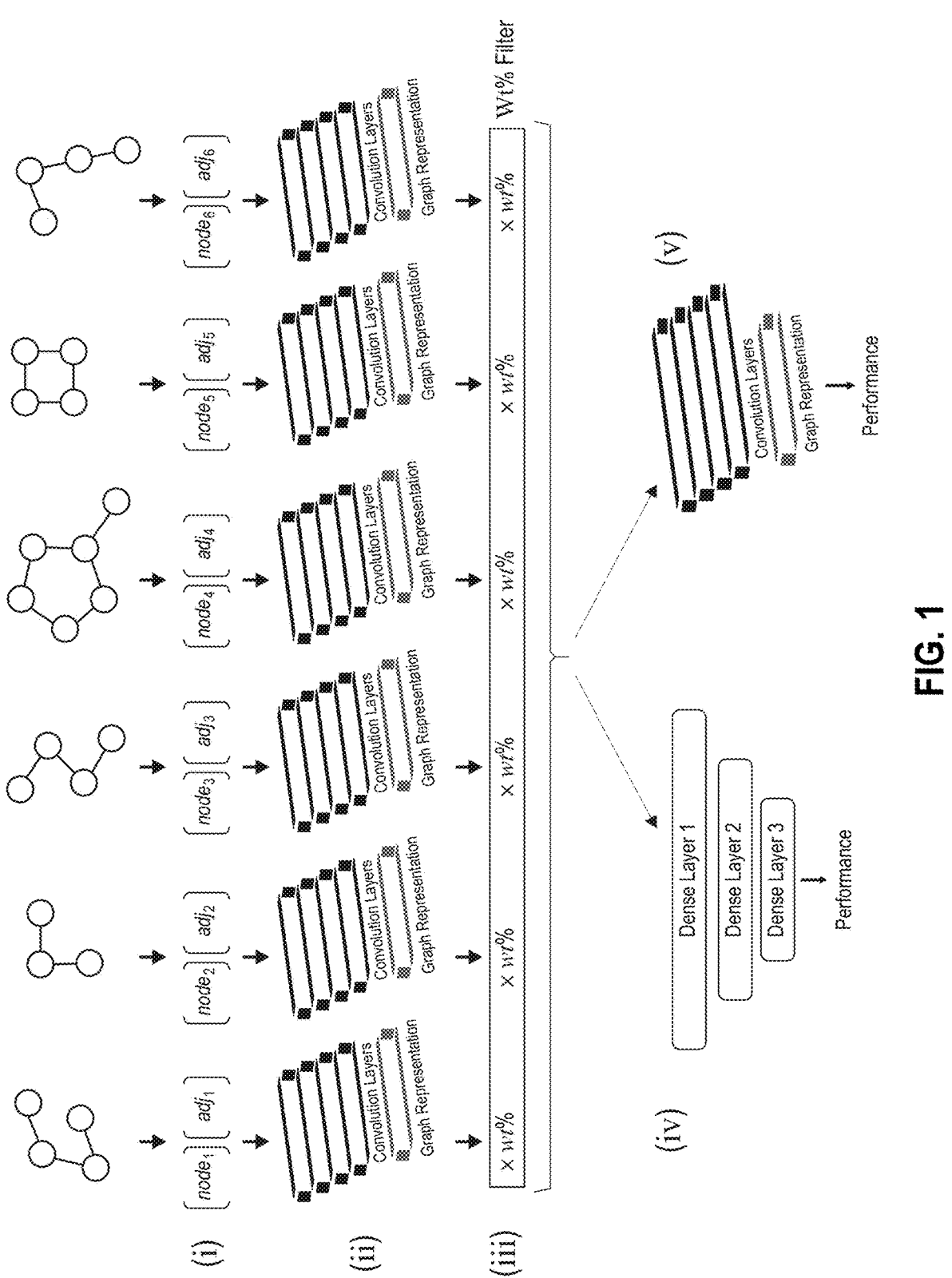
FIG. 1 is a schematic representation of the application of the formulation graph convolution network (F-GCN) described herein for predictive modeling of a formulation.

Set forth below is a description of what are currently believed to be preferred aspects and/or embodiments of the claimed invention. Any alternates or modifications in function, purpose, or structure are intended to be covered by the appended claims. As used in this specification and the appended claims, the singular forms "a," "an," and "the" include plural referents unless the context clearly dictates otherwise. The terms "comprise," "comprised," "comprises," and/or "comprising," as used in the specification and appended claims, specify the presence of the expressly recited components, elements, features, and/or steps, but do not preclude the presence or addition of one or more other components, elements, features, and/or steps.

As used herein, the term "deep learning" refers to an artificial intelligence (AI) function that mimics the workings of the human brain in processing and categorizing data. Deep learning-based AI is able to learn from data that is unstructured and unlabeled. In operation, deep learning-based AI programs find correlations between inputs and outputs by learning to approximate an unknown function (f(x)=y) between any input x and any output y, assuming they are related by correlation or causation.

As used herein, the term "neural network" refers to a deep learning classification algorithm that is modeled after the human brain with a collection of simulated neurons. Each neuron is a node that is connected to other nodes via links that are analogous to biological axo-synapse dendrite connections. Each link has a weight, which determines the strength of one node's influence on another. Neural networks learn (i.e., are trained) by processing examples, each of which contains a known input and output forming probability weighted associations between the input and the output. In operation, a neural network groups unlabeled input data according to similarities among example inputs, automatically extracts features from the groups, clusters groups with similar features, and classifies output data when there is a labeled dataset for training. The patterns recognized by a neural network are numerical and contained in vectors, which must be translated. Examples of neural network vectors include without limitation, images, sound, text, time, or combinations thereof.

As used herein, the term "convolutional neural network" or "CNN" is a classification algorithm where a neural network is applied to analyzing data. Generally, convolutional layers convolve input and pass its result to the next layer. While fully connected feedforward neural networks can be used to learn features and classify data, CNNs regularize multilayer fully connected networks where each neuron in one layer is connected to all neurons on the next layer. The nature of the fully connected layers of a CNN leads to overfitting data, which must be regularized. CNNs regularize by taking advantage of the hierarchical pattern in data to assemble complex patterns using smaller and simpler patterns. A CNN consists of an input layer, hidden middle layers, and an output layer. The hidden middle layers perform the convolutions. After passing through a convolutional layer, the data become abstracted to a feature map, which is the output of the convolution kernel that was applied to the previous layer.

As used herein, the term "graph convolution network" or "GCN" refers to a CNN that operates directly on graphs. GCNs differ from CNNs in that the latter are built to operate on regular (Euclidean) structured data where weights are shared in each recurrent step, while GCNs learn information from its neighbors within graph-structured data where weights are not shared between the individual hidden layers of the convolution. Within the context of the present invention, GCNs may be used for mapping molecular fingerprints and atomic networks, studying targeted interactions between two compounds, and predicting molecular properties, quantum chemical characteristics, and chemical reaction networks.

Building a GCN requires two representation features: "nodes" and "adjacency matrices" where nodes are the features of each input vector and adjacency matrices represent the edges or connections between each of the nodes in the graph-structured data. By way of example, a feed forward equation for a typical CNN may be represented by Formula (1):

$$N^{[i+1]} = \sigma\left(W^{[i]} N^{[i]} + b^{[i]}\right), \qquad (1)$$

where, $N^{[i+1]}$=Node feature at layer i+1;

$W^{[i]}$=weights at layer i;

$H^{[i]}$=Node feature at layer i; and $b^{[i]}$=bias at layer i;

i=0 or 1; and $\sigma$=the non-linear activation function that represents the non-linear features in latent dimension.

By contrast, a feedforward equation for a GCN may be represented by Formula (2):

$$N^{[i+1]} = \sigma\left(W^{[i]} N^{[i]} + A^*\right), \qquad (2)$$

where, $N^{[i+1]}$=node feature at layer i+1;

$W^{[i]}$=weights at layer i;

$N^{[i]}$=node feature at layer i; and

A*=normalized adjacency matrix;

i=0 or 1; and

σ=the non-linear activation function that represents the non-linear features in latent dimension.

In Formula (2), the replacement of the bias feature (which is no longer needed) with the adjacency matrix feature enables the GCN model to learn the feature representations based on nodes connectivity.

Training a GCN may be carried out with the following general steps: (i) running an initialization query; (ii) running a weight_initialization query; (iii) running a training query; and (iv) running a prediction query. In step (i), the initialization query normalizes the weights on each of the node edges by assigning a weight for each feature. In step (ii), the weight_initialization query initializes the weights for the GCN by identifying the total number of neurons in the input layer, the hidden layers, and the output layer. In step (iii), the training query evaluates the GCN using parameters, such as cross entropy loss, dropout normalization, and layer 2 regularization for the first layer. Upon completion of the training query, the following data will be available: the loss evaluated on the training data, the loss evaluated on the validation data, and the prediction accuracy evaluated on the testing data. In step (iv), the trained GCN is used on real data.

As used herein, the term "dual GCN" (also known in the art as "Graph of Graphs" or "GoG") refers to the modeling of two orthogonal graphs in a single framework that are capable of addressing local consistency and global consistency. Dual GCN are useful for mapping interactions in highly dense chemical spaces.

As used herein, the term "regularize" refers to the adjustment of a prediction function, while the term "normalize" refers to the adjustment of data.

Figure 5A:
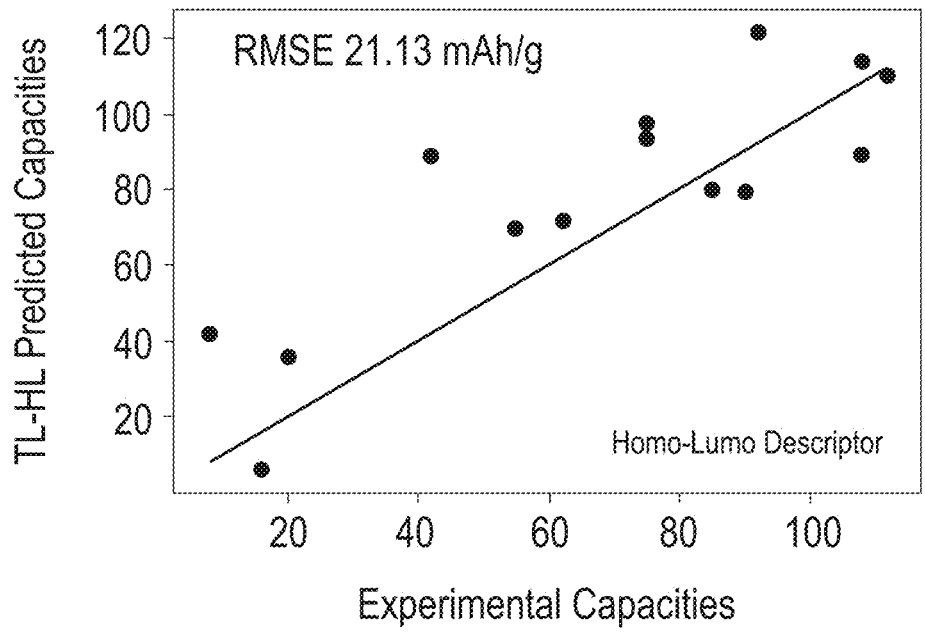
FIGS. 5A and 5B are graphs showing the prediction results of two electrolyte formulations described in Example 5.
Figure 5B:
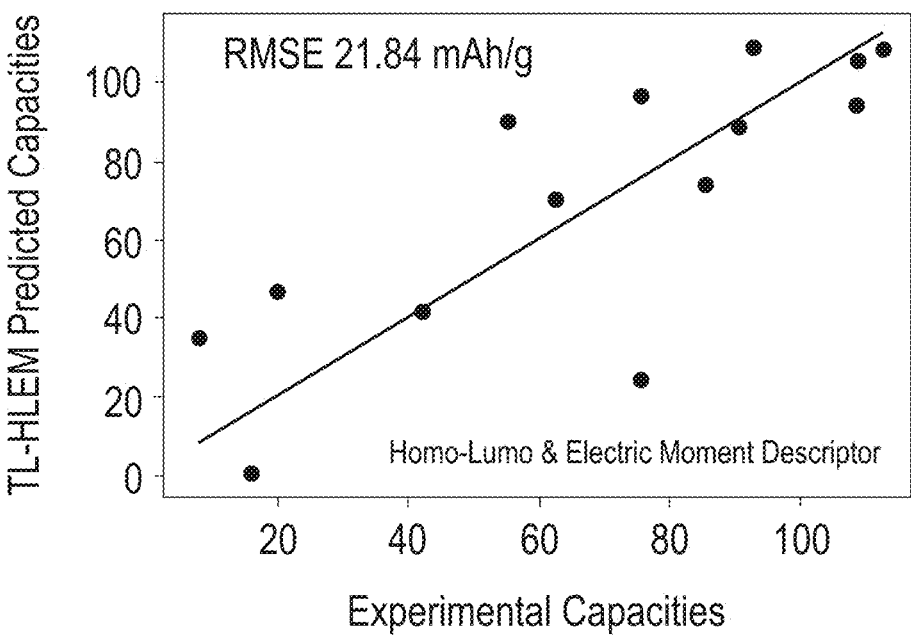
Figure 6A:
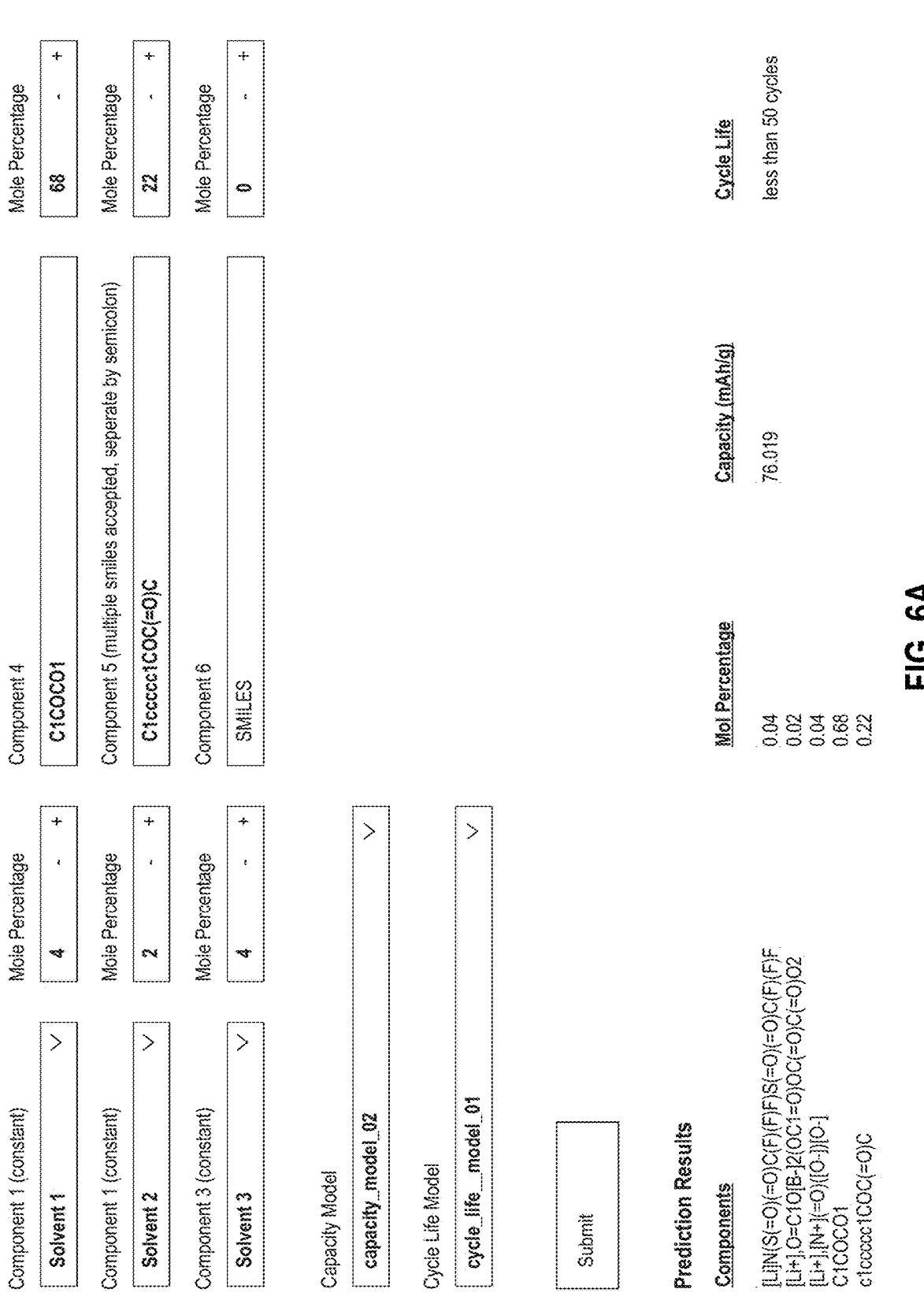
FIGS. 6A-6D is a representative interface that shows how different mole percentages of the individual components entered into the F-GCN predicts the capacitance of a battery.
Figure 6B:
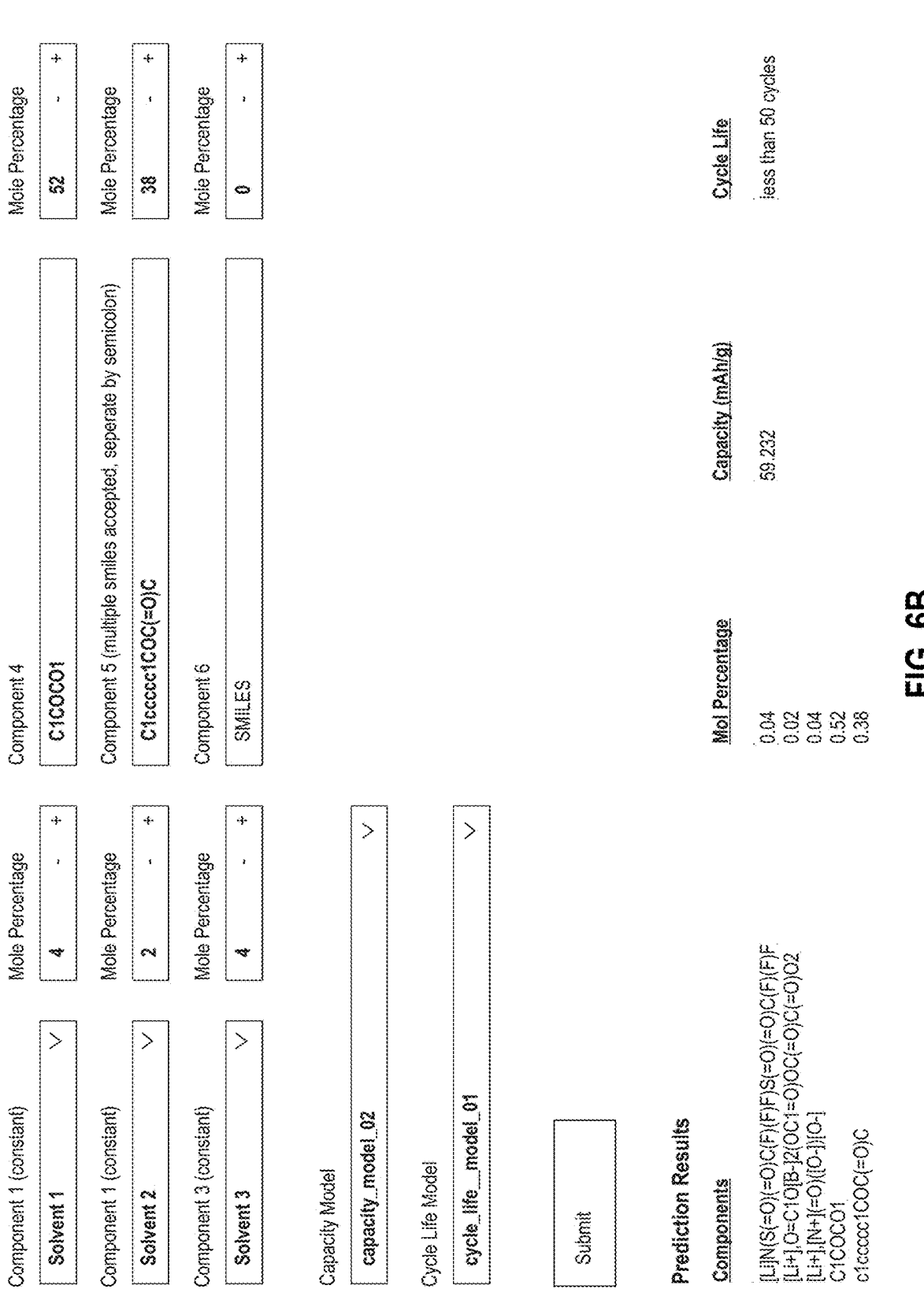
Figure 6C:
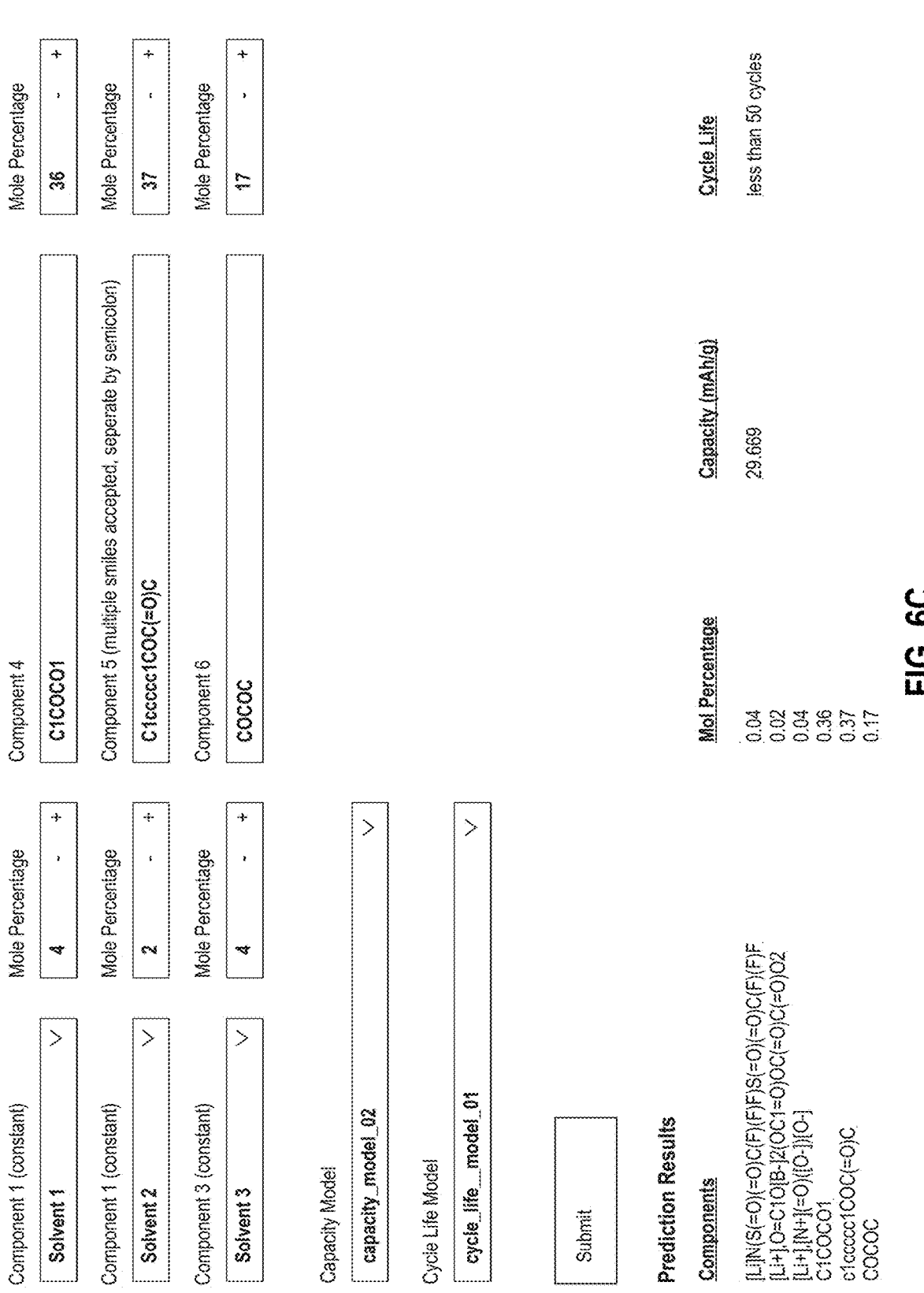
Figure 6D:
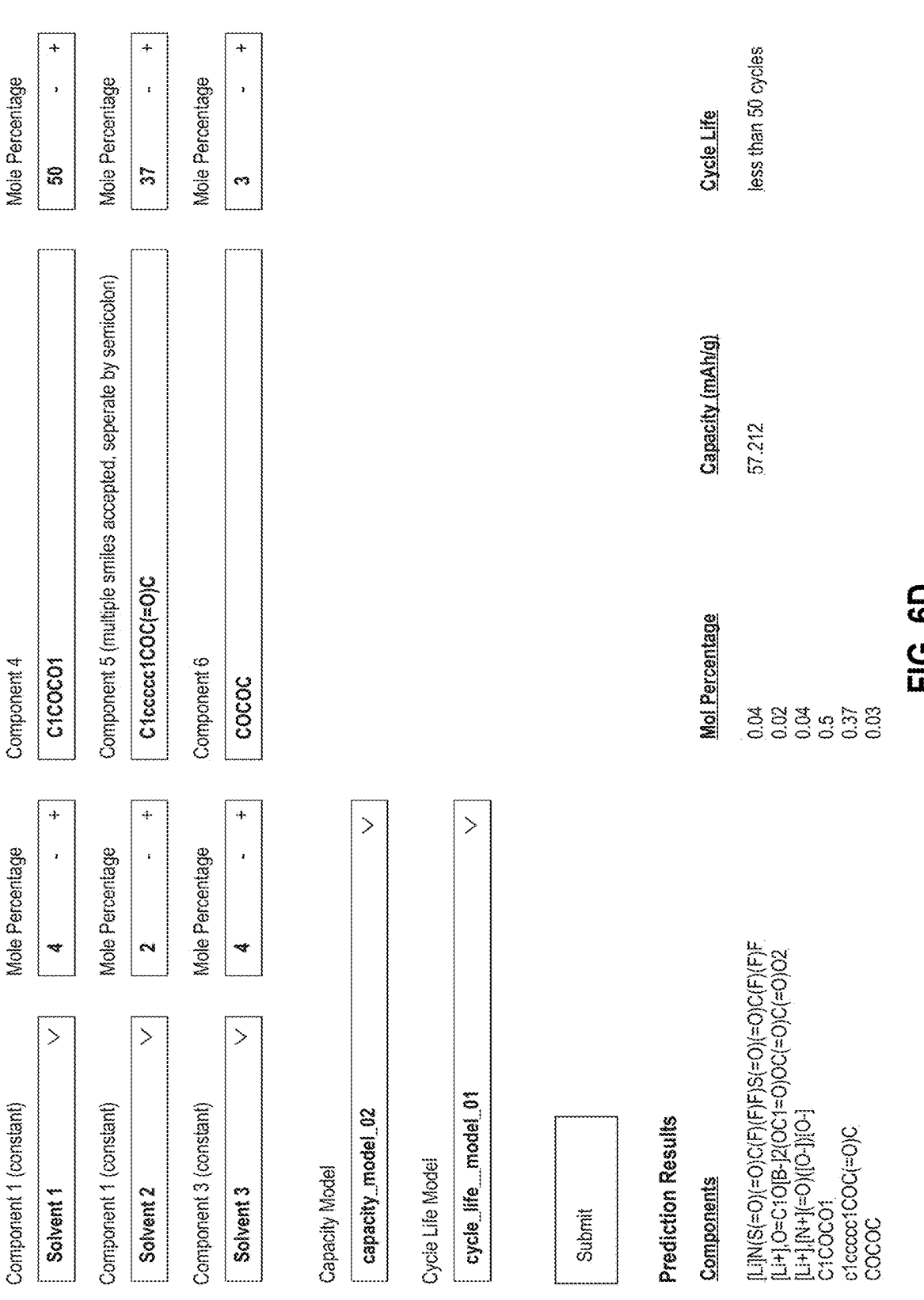

The term "RMSE" used in FIGS. 5A and 5B refers to "root mean square error," which is a measure for evaluating the quality of predictions. To compute RMSE, the residual difference between prediction and truth is calculated for each data point. RMSE is used in supervised learning application because it needs true measurements at each predicted point. RMSE is calculated according to Formula (3):

$$RMSE = \sqrt{\frac{\sum_{i=1}^{N}(y(i) - Y(i)^2}{N}} \tag{3}$$

where N is the number of data points, y(i) is the $i^{th}$ measurement, and Y(i) is its corresponding prediction.

As used herein, the term "F-GCN" refers to the application of multiple GCNs to test for formulations as described herein.

As used herein, the term "molecular graph" refers to a labeled graphical representation of a molecular structure where vertices correspond to the atoms of the compound and edges correspond to chemical bonds. Within the context of the present invention, where an input into the F-GCN described herein is a SMILES formula, the output is a molecular graph, the latter of which are generated by the F-GCN via one-hot encoding of relevant molecular information for the molecular structure.

As used herein, the term "physico-chemical properties" refers to the physical and/or solvation properties relating to interactions between different media and/or chemical reactivities. Within the context of the present invention, physico-chemical properties include, without limitation, dielectric constants, energy levels, ionic conductivity, and viscosity.

As used herein, the term "symbolic line notation" refers to linear strings of characters that represent structures. Examples of symbolic line notations include, without limitation, SMILES (simplified molecular input line entry system), INCHI Keys (27-character international chemical identifier), SELFIES (self-referencing embedded strings), and BigSMILES (SMILES syntax for polymers).

As used herein, the term "one-hot encoding" refers to a computational method for pre-processing categorical variables such that within a group of bits, one variable is identified as a single high (1) (the "one-hot") while all the others are low (0). One-hot encoding enables non-numeric input variables, such as for example atoms or molecules, to become numeric values suitable for computational analyses in AI systems. By way of illustration, Table 1 shows atomic position one-hot encoding for a node vector having two carbon atoms at position 6 and four hydrogen atoms at position 1. It is to be understood that a one-hot encoded matrix may have as many or as few positions as are necessary to encode the required information. In Table 1, ten positions were chosen as a representative number for the relatively small vector node.

TABLE 1

|   | 1 | 2 | 3 | 4 | 5 | 6 | 7 | 8 | 9 | 10 |
|---|---|---|---|---|---|---|---|---|---|----|
| C | 0 | 0 | 0 | 0 | 0 | 1 | 0 | 0 | 0 | 0 |
| C | 0 | 0 | 0 | 0 | 0 | 1 | 0 | 0 | 0 | 0 |
| H | 1 | 0 | 0 | 0 | 0 | 0 | 0 | 0 | 0 | 0 |
| H | 1 | 0 | 0 | 0 | 0 | 0 | 0 | 0 | 0 | 0 |
| H | 1 | 0 | 0 | 0 | 0 | 0 | 0 | 0 | 0 | 0 |
| H | 1 | 0 | 0 | 0 | 0 | 0 | 0 | 0 | 0 | 0 |

Table 2 shows the one-hot encoding of the electronegativity data into the node matrix of Table 1.

TABLE 2

|   | 1 | 2 | 3 | 4 | 5 | 6 | 7 | 8 | 9 | 10 |
|---|---|---|---|---|---|---|---|---|---|----|
| C | 0 | 0 | 0 | 0 | 0 | 2.55 | 0 | 0 | 0 | 0 |
| C | 0 | 0 | 0 | 0 | 0 | 2.55 | 0 | 0 | 0 | 0 |
| H | 2.2 | 0 | 0 | 0 | 0 | 0 | 0 | 0 | 0 | 0 |
| H | 2.2 | 0 | 0 | 0 | 0 | 0 | 0 | 0 | 0 | 0 |
| H | 2.2 | 0 | 0 | 0 | 0 | 0 | 0 | 0 | 0 | 0 |
| H | 2.2 | 0 | 0 | 0 | 0 | 0 | 0 | 0 | 0 | 0 |

Table 3 shows the one-hot encoding of the adjacency matrix, which adds information about the molecule's neighbors and types of bonds where, for example, a single bond is represented by the number 1, double bonds by 2, triple bonds by 3, and aromatic bonds by 1.5.

TABLE 3

|   | C | C | H | H | H | H |
|---|---|---|---|---|---|---|
| C | 1 | 2 | 1 | 1 | 0 | 0 |
| C | 2 | 1 | 0 | 0 | 1 | 1 |
| H | 1 | 0 | 1 | 0 | 0 | 0 |
| H | 1 | 0 | 0 | 1 | 0 | 0 |
| H | 0 | 1 | 0 | 0 | 1 | 0 |
| H | 0 | 1 | 0 | 0 | 0 | 1 |

As used herein, the term "molecular descriptor" refers to mathematical representations of a molecule's properties that quantitively describe the physical and chemical information of the molecule. Molecular descriptors may be one-dimensional (1D), two-dimensional (2D), or three-dimensional (3D). 1D descriptors are the simplest form of molecular descriptors and represent information that is calculated from the molecular formula of the molecule, such as the count and type of atoms in the molecule and the molecular weight. 2D descriptors represent information regarding the size, shape, and electronic distribution of the molecule, the latter of which includes such properties as dipole moment, polarizability, energy at homo, and energy at lumo. 3D descriptors represent properties related to the confirmation of the molecule, such as intramolecular hydrogen bonding, lipophilicity (also known as log P), and molar refractivity. Within the context of the present invention, a molecular descriptor will interpret a molecular graph into a matrix format.

As used herein, the terms "homo" and "lumo" refer to types of molecular orbitals where "homo" stands for "highest occupied molecular orbital" and "lumo" stands for "lowest unoccupied molecular orbital. The difference between the homo and lumo is called the "homo-lumo gap." The size of the gap can be used to predict the strength and stability of transition metal complexes, as well as the colors they produce in solution. As a general rule, the larger a compound's homo-lumo gap, the more stable is the compound.

As used herein, the term "formulation descriptor" refers to multiple molecular descriptors that are combined to form a descriptor for a formulation.

As used herein, the term "formulant" and "formulants" refers to the active, inactive, and/or inert substances that comprise a formulation.

As used herein, the term "formulation" is used in its ordinary meaning to refer to a material or mixture prepared in a certain way and used for a specific application. Within the context of the present invention, a formulation may be a liquid, an emulsion, a semi-solid composition, or a solid composition.

The F-GCN model described herein may be used to predict properties pertaining to liquid and/or solvent formulations. The model captures molecular structural information of formulants as graphs, filters the graphical representations of the structures based upon the weight or molar percentage of the structures in the formulation, and incorporates the graphical representations into an external learning architecture that predicts the performance metrics of the formulations for a particular application. In one non-limiting example, the application is a battery electrolyte and F-GCN is used to predict the performance of a liquid formulation comprising a mixture of solvents and salts.

The F-GCN model uses information held within the structure of molecules as input features. FIG. 1 is an exemplary schematic of the F-GCN model as applied to six different molecular structures. The model includes an internal graph network that maps the molecular structures into graphical representations, an intermediate layer that filters the graphical representations based on the molar or weight composition of the molecular structures in a formulation, and an external network that maps the performance of the formulation for an application based upon the filtered graphical information of the molecular structures.

Input into the F-GCN may be through any molecular representation that describes the connectivity and chirality of a molecular structure. For example, molecular representations may be a symbolic line notation or a distance matrix that is converted to an adjacency matrix by imposing thresholds on distances.

With reference to FIG. 1(i), to form a molecular graph, two different matrices are constructed for each molecule: a node matrix and an adjacency matrix. The node matrix contains information about the atoms present within the molecular structure and is built by embedding the atomic position and electronegativity of the atoms in the molecular graph via one-hot encoding. The adjacency matrix contains information about the bonds between the atoms. Examples of such bonds, include, without limitation, single, double, triple, and aromatic bonds.

With reference to FIG. 1(ii), convolution actions are performed on each molecular graph in hidden convolution layers to modify the node matrix. The weights of the graph convolution layers are pre-trained on homo-lumo energy levels of hundreds of molecules, which have been programmed into the F-GCN. During each convolution, the GCN model learns about the chemical neighborhood of the atoms. With increasing number of convolutions, the chemical neighborhood for each atom is expanded. The graphical representations from the convolution layers are the GCN outputs for the molecules in the formulation.

With reference to FIG. 1(iii), a filter is applied to the graphical representations that are outputs from GCNs for each molecule, based on each molecule's weight percentage in the formulation. Instead of weight percentage, the filter may also use molar percentage, volume fraction, or any other method of calculating the normalized ratios of the amounts of the different ingredients in a formulation. The filtered graphical representations are then passed onto an external deep learning architecture that is connected to the F-GCN output.

With reference to FIG. 1(iv), an external trainable dense neural network predicts the performance metrics of the formulants by mapping the relationship between the molecular structure, its composition in the formulation, and the predicted performance of the formulation for an application.

With reference to FIG. 1(v), the performance metrics of the F-GCN may be enhanced through the addition of an external trainable GCN that adds the chemical network relationship to the filtered graphical representations shown in FIG. 1(iii). The combination of the molecular GCNs and the external trainable GCN forms a dual GCN that can produce a large graph of formulation in order to imitate the chemical reaction networks within a formulation.

Figure 2:
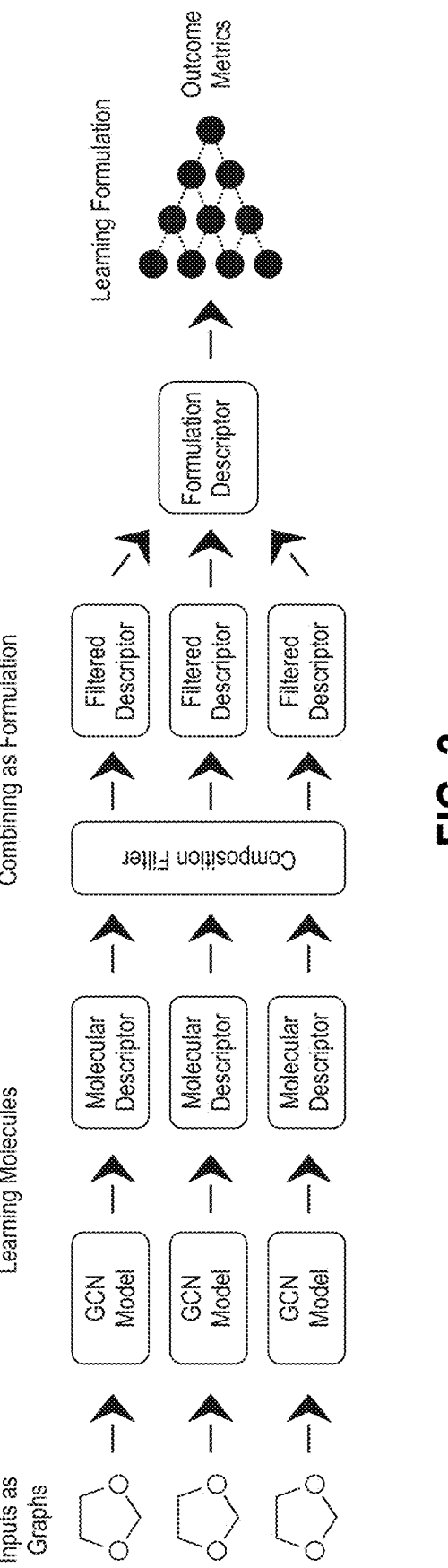
FIG. 2 is a schematic representation of the algorithm used for the F-GCN.

FIG. 2 is a schematic showing the general outline of the algorithm used for the formulation prediction metrics described herein from input to output. As shown therein, molecular structures are used as inputs into the F-GCN model, forms molecular graphs that learn the chemistry of the molecular structures, and labels the molecular graphs with molecular descriptors. The molecular descriptors are filtered through a composition filter to produce filtered descriptors, which are assembled into a formulation descriptor, which may be trained via the external trainable neural and convolution networks shown schematically in FIG. 1(iv) and FIG. 1(v) to result in a performance metric prediction for a formulation based upon one or more of the original input molecular structures.

Figure 3:
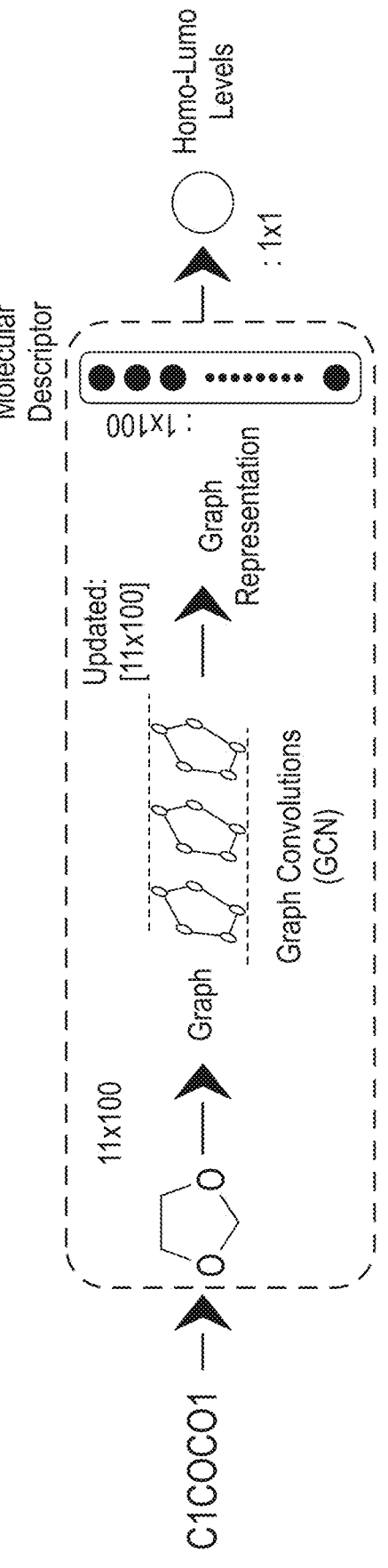
FIG. 3 is a schematic representation of the pre-training of the F-GCN.

FIG. 3 is a schematic representation of the pre-training of the GCN on homo-lumo energy levels. The purpose of the pre-training is for the GCN to learn the local chemical environment of the atoms in a molecule and correlate that information with physico-chemical molecular properties, such as homo-lumo energy levels, in the case of predicting the performance of battery electrolytes. The molecular data used for the pre-training may be computationally generated or obtained through open sources. While the pre-training of the GCN is carried out on hundreds of molecules, FIG. 3 demonstrates the process on a single 1,3-dioxolane molecule for purposes of illustration. In operation, a symbolic line notation for 1,3-dioxolane is input into the GCN (SMILES is shown in FIG. 3, although any symbolic line notation may be used), which has been constructed into a node matrix one-hot encoded with electronegativities and a corresponding adjacency matrix. For the 1,3-dioxolane shown in FIG. 3, the node matrix is a 11×100 matrix, which represents the 11 atoms in 1,3-dioxolane taken out to 100 positions. After the convolutions are performed on the molecular graph for the 1,3-dioxolane, and the GCN has learned as much information as it can about the chemical neighborhood of the molecule, the GCN generates a molecular descriptor for the molecular structure, which includes information on the homo-lumo energy level of the molecular structure from the process of backpropagation during learning. The GCN learns the homo-lumo energy levels for all of the pre-training molecules and uses this knowledge for recognizing characteristics of local chemical environments in molecular structures. The GCN thus trains within two domains: the learning of molecular graphs and the learning of formulations, former of which is attained during pre-training of GCN and latter of which is attained during training of F-GCN with formulation data. The two-domain F-GCN model training thus overcomes the current practice in the art of requiring large experimentally derived formulation data for GCN training.

Figure 4:
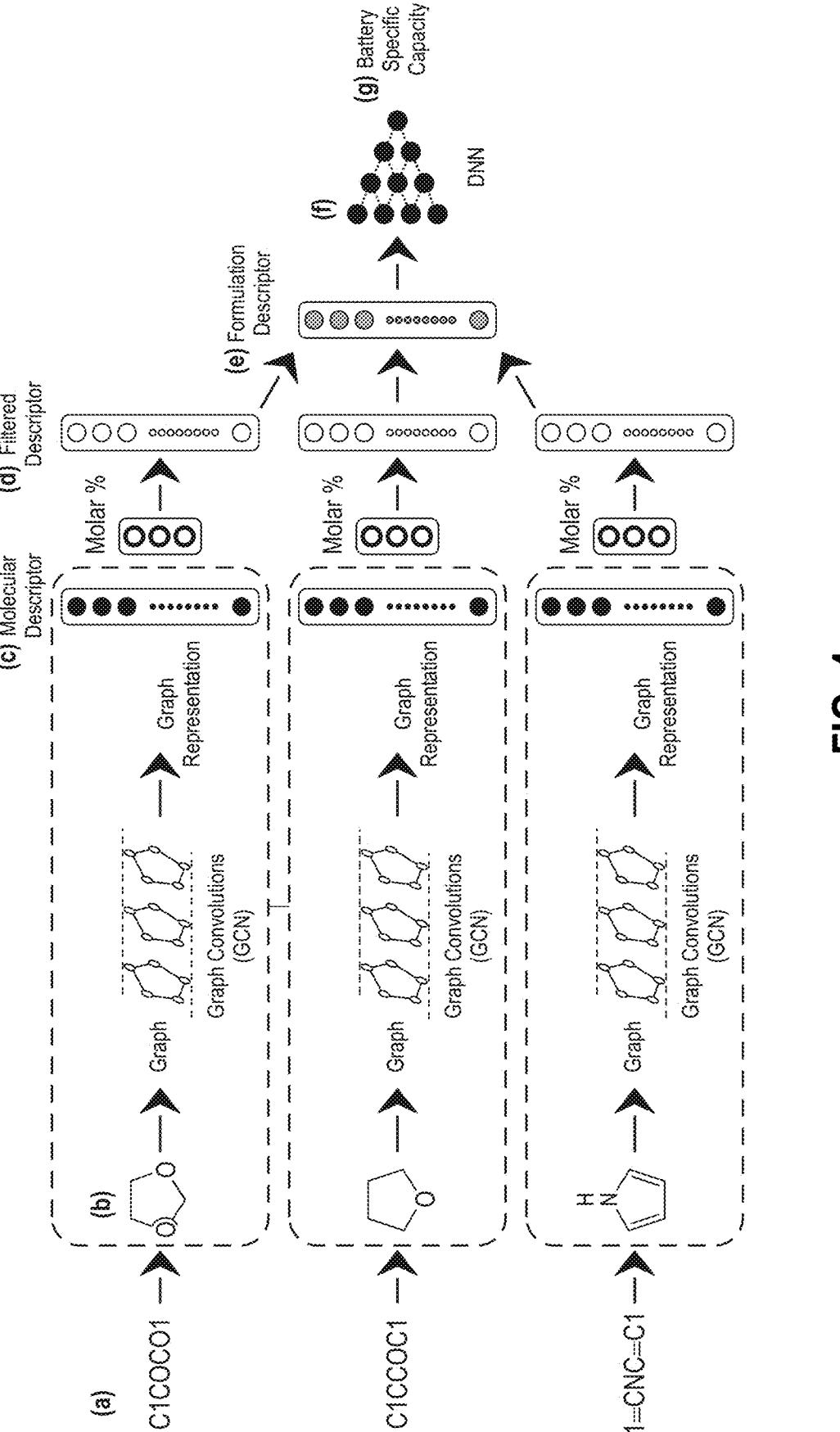
FIG. 4 is a schematic representation of the application of the F-GCN for predicting battery specific capacity of an electrolyte formulation.

FIG. 4 shows application of a pre-trained GCN in a complete F-GCN to predict the battery capacity of a formulation comprised of the exemplary compounds 1,3-dioxolane, tetrahydrofuran, and pyrrole, all of which may be used in battery electrolytes and/or solvent mixtures. The SMILES formulas (a) for three molecular structures are input into three GCNs respectively (b), the latter of which have been programmed with node and adjacency matrices one-hot encoded with the atomic position and electronegativity of the atoms comprising the respective molecules. Once within the GCNs, graphical representations for the individual bond compositions and networks of the atoms within the molecules are generated as labeled molecular descriptors (c) the latter of which the GCN learned via the pre-training on the homo-lumo energy level labels described above. The three molecular descriptors constitute the GCN outputs. Next, a composition filter (shown in FIG. 2) scales the molecular descriptors based on the molecule's molar percentage in a formulation. As previously noted, the molecule's weight percentage, or any other method of calculating the normalized ratios of the amounts of the different ingredients (i.e., molecular structures) in the formulation, may be used instead of or in addition to the molar percentage. The molecular structures, along with the amounts of their normalized ratios, are entered by a user into the F-GCN interface. FIGS. 6A-6D show an exemplary, but non-limiting, interface for the F-GCN described herein where molar percentages of three different solvents are entered into three of six parallel GCNs. The scaled molecular descriptors are then combined by a filtered descriptor (d) into a single formulation descriptor (e) that represents each molecular structure present in the formulation. The single formulation descriptor is subsequently fed into a dense neural network (f), which calculates the battery specific capacity (g) (i.e., the effectiveness) of the formulation covered by the formulation descriptor.

Example 1 describes the build of an exemplary F-GCN. It is to be understood that the F-GCN described in Example 1 represents just one possible implementation of the F-GCN described herein and that one of skill in the art will understand that other libraries, activation functions, network architectures, training protocols, etc. may be used to build an F-GCN as described herein.

FIGS. 5A and 5B (Example 2) show that electrolyte formulations designed using an F-GCN pre-trained only with homo-lumo energy levels result in better battery electrolyte performance predictions than electrolyte formulations designed using an F-GCN pre-trained with both homo-lumo energy levels and electric dipole moments. The results of Example 2 show the importance of proper pre-training of the GCN in order to obtain the most accurate predictions for formulation performance from F-GCN.

In application, once the F-GCN is built, determining performance of a formulation is instantaneously carried out by the F-GCN. By way of example, within an interface for the F-GCN, a user enters the SMILES formulas for various molecular compounds and the molar or weight percentage of each molecular compound in a potential formulation. Upon entry of this information, the trained F-GCN immediately processes the information to provide a performance value for the potential formulation. For example, for an electrolyte formulation, a user may enter the SMILES formulas for various different molecular compounds that may comprise an electrolyte. By entering different molar or weight percentages for each of the molecular compounds, the F-GCN is able to provide the user with different battery capacities for each formulation. In this way, a user is able to test various different electrolyte formulations to determine which has the best battery performance. It is to be understood that while operation of the F-GCN provides instantaneous results, the training of the F-GCN on a large dataset will take an appropriate amount of time for the building of the node and adjacency matrices for each molecular compound in the training set and the testing of the molecular descriptor labels.

Figure 7:
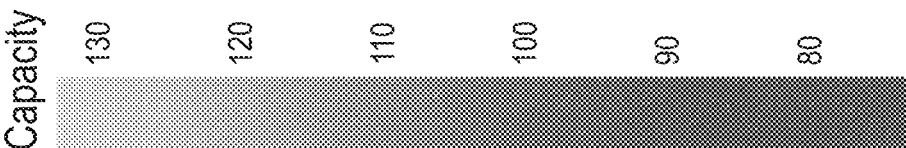
FIG. 7 is a schematic diagram showing how the F-GCN may be used for formulation optimization with three fixed components and differing molar percentages.
Figure 7:
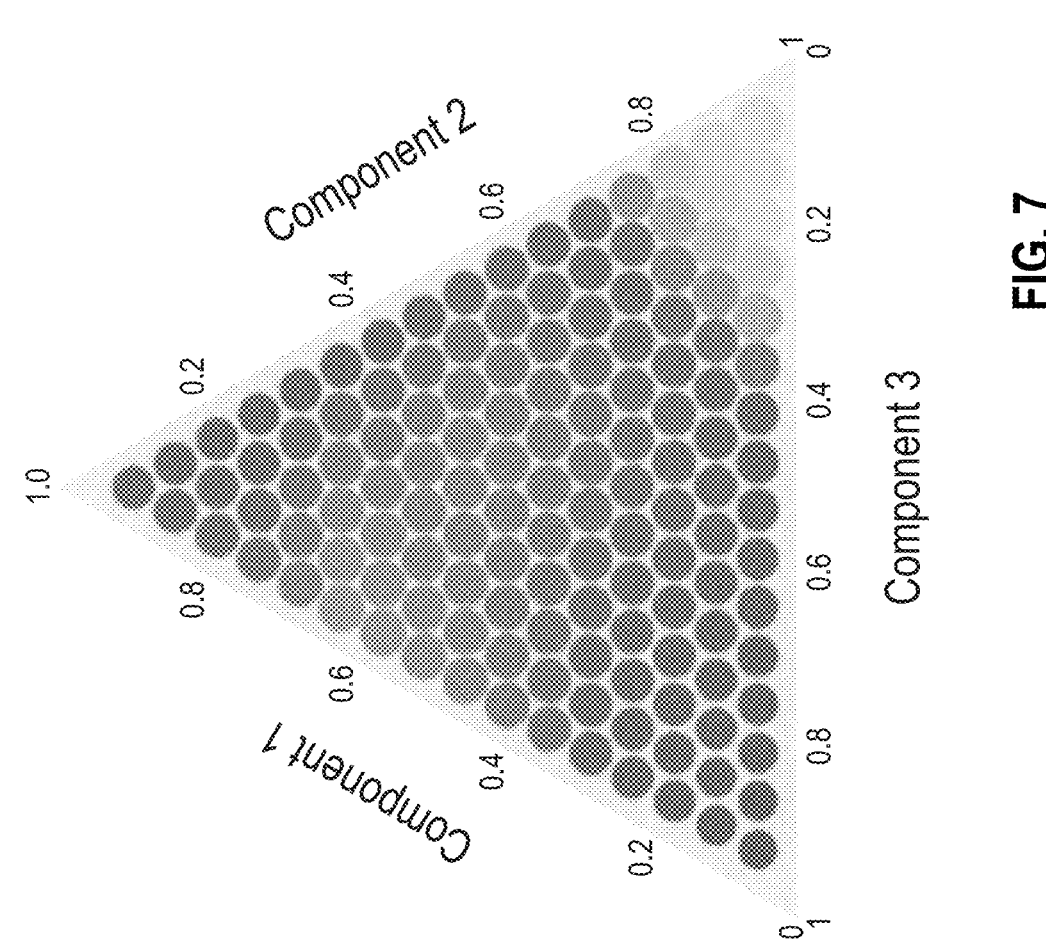

FIGS. 6A-6D show a representative capacity predicting interface with electrolyte formulations constituting of three constant compounds (solvent 1 at 4 M %; solvent 2 at 2 M %, and solvent 3 at 4 M %) and three variable solvents represented by the SMILES formulas at four different molar percentages: C1COCO1 at 68, 52, 36, and 50 M %, c1cccc1COC(=O)C at 22, 38, 37, and 37 M %, and COCOC at 0, 0, 17 and 3 M %. The battery capacitance (in mAh/g) for the four formulations is shown instantaneously in the interface as 76.019, 59.232, 29.669, and 57.212, respectively. Cycle life of the four formulations is also shown. The F-GCN model shown in FIGS. 6A-6D has six parallel GCNs representing an electrolyte formulation with six formulants. It is to be understood that the number of GCNs shown in FIGS. 6A-6D is exemplary and that the number of GCNs in any F-GCN is customizable. Within the context of the six GCN interface of FIGS. 6A-6D, for electrolyte formulations containing less than six formulants, the unused GCNs are default selected with water and a molar composition of zero. In this way, a single F-GCN model can handle data points with variability in formulant count. FIG. 7 shows how the F-GCN may be used for formulation optimization when components are fixed (as is shown in FIGS. 6A-6D) and the concentration/composition of each component is varied. As shown therein, a battery capacitance of 130 mAh/g may be achieved when the three components are at the following molar percentages: component 1, ~0.15 M %; component 2, ~0.7 M %; and component 3, ~0.15 M %.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following discussion refers to FIG. 8. Computing environment 100 contains an example of an environment for the execution of at least some of the computer code involved in performing the inventive methods, such as a new F-GCN code that is applicable to formulations 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various aspects and/or embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the aspects and/or embodiments, the practical application or technical improvement over technologies found in the market place, or to enable others of ordinary skill in the art to understand the aspects and/or embodiments disclosed herein.

EXPERIMENTAL

The following examples are set forth to provide those of ordinary skill in the art with a complete disclosure of how to make and use the aspects and embodiments of the invention as set forth herein. All components were obtained commercially unless otherwise indicated.

Example 1

Exemplary F-GCN Build

Implementation of a python version of a F-GCN model was carried out with the keras API with tensorflow. A symbolic line notation, such as SMILES, of each formulant was converted to molecular conformations by RDKit package and then transformed to graphs for the GCNs. Each GCN took the molecular graphs and performed a set of four convolutions before giving molecular descriptors as output. A non-linear activation function, tan H, was applied to the output from each convolution layer before passing to the next layer. External learning architecture constituted a three-layered dense neural network with 1000-100-10 nodes, last of which connected to an output label node. Robust convergence during the model training was noted when relu activation function was applied to the hidden layers of the external learning architecture, while the last layer was linearly connected to the output label. The model was converged during training with an Adam optimizer and a learning rate as small as 0.0001. the F-GCN model was trained on 99 formulations in the training data in the batch size of one until the convergence was reached. It took approximately 20000 epochs to reach convergence.

Example 2

Performance Prediction of Battery Electrolytes

The effectiveness of the F-GCN described in Example 1 was established using an electrolyte formulation-based capacity prediction with an input set of 130 potential electrolyte formulations. As noted in Example 1, the F-GCN was trained with 99 known electrolyte formulations where the GCNs were pre-trained with the labels: (1) homo-lumo (HL) and (2) homo-lumo and electric dipole moment (HL-EM). Each molecular descriptor obtained as output of the GCN was filtered by weight or molar weight percentage and combined to form a formulation descriptor, which was run through a dense neural network to predict the battery specific capacity of the electrolyte formulation defined by the formulation descriptor. FIG. 5A is plot showing the predicted battery capacities from HL based F-GCN model on the y-axis as scatter points for 14 test (new to model) electrolyte formulations against the measured experimental battery capacities for the same 14 formulations on the x-axis that are plotted as straight line. FIG. 5B is plot showing the predicted battery capacities from HL-EM based F-GCN model on the y-axis as scatter points for 14 test (new to model) electrolyte formulations against the measured experimental battery capacities for the same 14 formulations on the x-axis that are plotted as straight line. FIGS. 5A and 5B show that the formulations designed with just the HL energy levels produced battery prediction capacities that were closer to the experimental battery capacities than the electrolyte formulations designed with HL energy levels and electric dipole moment.

We claim:

1. A system comprising:
a processor set;
one or more computer readable storage media; and
program instructions stored on the one or more computer readable storage media to cause the processor set to perform operations comprising:
inputting multiple molecular structures into multiple respective graph convolution networks (GCNs) assembled in parallel, wherein input into each GCN is a molecular structure of the multiple molecular structures and output from each GCN is a molecular descriptor of the corresponding input molecular structure;
scaling each molecular descriptor based on a normalized ratio of each respective molecular structure in a formulation;
combining each scaled molecular descriptor to form a single formulation descriptor representing each molecular structure in the formulation; and
obtaining a performance label for the formulation from a neural network, wherein the neural network generates the performance label as output based on the single formulation descriptor as input.

2. The system of claim 1, wherein the molecular structures are input into the GCN via a symbolic line notation of the molecular structure.

3. The system of claim 1, wherein the molecular structures input into each GCN comprise a node matrix and an adjacency matrix, wherein the node matrix comprises information about atoms in the corresponding input molecular structure and the adjacency matrix comprises information about bonds within the corresponding input molecular structure.

4. The system of claim 3, wherein the node matrix comprises one-hot encoded electronegativities of atoms in the corresponding input molecular structure.

5. The system of claim 1, wherein the multiple GCNs are pre-trained with physico-chemical properties of known molecular structures.

6. A system comprising:

a processor set;

one or more computer readable storage media; and program instructions stored on the one or more computer readable storage media to cause the processor set to perform operations comprising:

inputting multiple molecular structures into multiple respective graph convolution networks (GCNs) assembled in parallel of a formulation graph convolution network (F-GCN), wherein input into each GCN is a molecular structure of the multiple molecular structures for a compound in an electrolyte formulation and output from each GCN is a molecular descriptor of the corresponding input molecular structure;

scaling, by an intermediate layer of the F-GCN, the molecular descriptor of each of the multiple molecular structures according to a normalized ratio of each respective molecular structure in the electrolyte formulation;

combining, by an output layer of the F-GCN, each scaled molecular descriptor to form a single formulation descriptor representing each molecular structure in the electrolyte formulation; and obtaining a battery capacitance performance label for the electrolyte formulation from a neural network as output based on the single formulation descriptor as input.

7. The system of claim 6, wherein the molecular structures are input into the GCN via a symbolic line notation selected from the group consisting of SMILES, INCHI Keys, SELFIES, and BigSMILES.

8. The system of claim 6, wherein the molecular structures input into each GCN comprise a node matrix and an adjacency matrix, wherein the node matrix comprises information about atoms in the corresponding input molecular structure and the adjacency matrix comprises information about bonds within the corresponding input molecular structure.

9. The system of claim 8, wherein the node matrix comprises one-hot encoded electronegativities of atoms in the corresponding input molecular structure.

10. The system of claim 6, wherein the multiple GCNs are pre-trained with homo-lumo energy levels from known molecular structures.

11. A computer-implemented method comprising:

inputting multiple molecular structures into multiple respective graph convolution networks (GCNs) arranged in parallel of a formulation graph convolutional network (F-GCN), wherein input into each GCN is a molecular structure of the multiple molecular structures and output from each GCN is a molecular descriptor of the corresponding input molecular structure;

scaling, by an intermediate layer of the F-GCN, each of the molecular descriptors based on a normalized ratio of each respective molecular structure in a formulation;

combining, by an output layer of the F-GCN, each scaled molecular descriptor to form a single formulation descriptor representing each molecular structure in the formulation; and feeding the single formulation descriptor into an external learning architecture comprising a neural network to obtain a performance label of the formulation based on the single formulation descriptor.

12. The computer-implemented method of claim 11, wherein the molecular structures are input into the GCN via symbolic line notation for the molecular structures.

13. The computer-implemented method of claim 11, wherein the molecular structures input into each GCN comprise a node matrix and an adjacency matrix, wherein the node matrix comprises information about atoms in the corresponding input molecular structure and the adjacency matrix comprises information about bonds within the corresponding input molecular structure.

14. The computer-implemented method of claim 13, wherein the node matrix comprises one-hot encoded electronegativities of atoms in the corresponding input molecular structure.

15. The computer-implemented method of claim 11, wherein the multiple GCNs are pre-trained with physical chemical properties of known molecular structures.

16. The computer-implemented method of claim 11, wherein the external learning architecture is selected from a group consisting of a dense neural network and a GCN.

17. A computer-implemented method comprising:

inputting multiple molecular structures of a battery electrolyte formulation into multiple respective graph convolution networks (GCNs) arranged in parallel of a formulation graph convolution network (F-GCN), wherein input into each GCN is a molecular structure of the multiple molecular structures of the battery electrolyte formulation and output from each GCN is a molecular descriptor of the corresponding input molecular structure;

scaling, by an intermediate layer of the F-GCN, each of the molecular descriptors based on a normalized ratio of each respective molecular structure in the battery electrolyte formulation;

combining, by an output layer of the F-GCN, each scaled molecular descriptor to form a single formulation descriptor representing each molecular structure in the battery electrolyte formulation; and feeding the single formulation descriptor into an external learning architecture comprising a neural network to cause generation of a battery capacitance prediction for the battery electrolyte formulation.

18. The computer-implemented method of claim 17, wherein the molecular structures are input into the GCN via a symbolic line notation selected from the group consisting of SMILES, INCHI Keys, SELFIES, and BigSMILES.

19. The computer-implemented method of claim 17, wherein the molecular structures input into each GCN comprise a node matrix and an adjacency matrix, wherein the node matrix comprises information about atoms in the corresponding input molecular structure and the adjacency matrix comprises information about bonds within the corresponding input molecular structure.

20. The computer-implemented method of claim 19, wherein the node matrix comprises one-hot encoded electronegativities of atoms in the corresponding input molecular structure.

21. The computer-implemented method of claim 17, wherein the multiple GCNs are pre-trained with homo-lumo energy levels from known molecular structures.

22. A computer program product comprising:

one or more computer readable storage media; and program instructions stored on the one or more computer readable storage media to perform operations comprising:

inputting multiple molecular structures into multiple respective graph convolution networks (GCNs) assembled in parallel of a formulation graph convolutional network (F-GCN), wherein input into each GCN is a molecular structure of the multiple molecular structures and output from each GCN is a molecular descriptor of the corresponding input molecular structure;

scaling, by an intermediate layer of the F-GCN, each the molecular descriptors based on a normalized ratio of each respective molecular structure in a formulation;

combining, by an output layer of the F-GCN, each scaled molecular descriptor into a single formulation descriptor representing each molecular structure in the formulation; and feeding the single formulation descriptor into an external learning architecture comprising a neural network to obtain a prediction performance label for the formulation for an application.

23. The computer program product of claim 22, wherein the molecular structures are input into the GCN via symbolic line notations for the molecular structures.

24. The computer program product of claim 22, wherein the molecular structures input into each GCN comprises a node matrix and an adjacency matrix, wherein the node matrix comprises one-hot encoded electronegativities of atoms in the corresponding input molecular structure and the adjacency matrix comprises information about bonds within the corresponding input molecular structure.

25. The system of claim 1, wherein the multiple GCNs are pre-trained with homo-lumo energy levels of known molecular structures, wherein the molecular structures input into each GCN are in an embedded form comprising a node matrix and an adjacency matrix, wherein the node matrix comprises one-hot encoded electronegativities of atoms in the corresponding input molecular structure and the adjacency matrix comprises information about bonds within the corresponding input molecular structure, wherein the embedded forms of corresponding molecular structures are modified by a respective GCN of the multiple GCNs to obtain the corresponding molecular descriptor as output.

\* \* \* \* \*